UNITED STATES PATENT OFFICE.

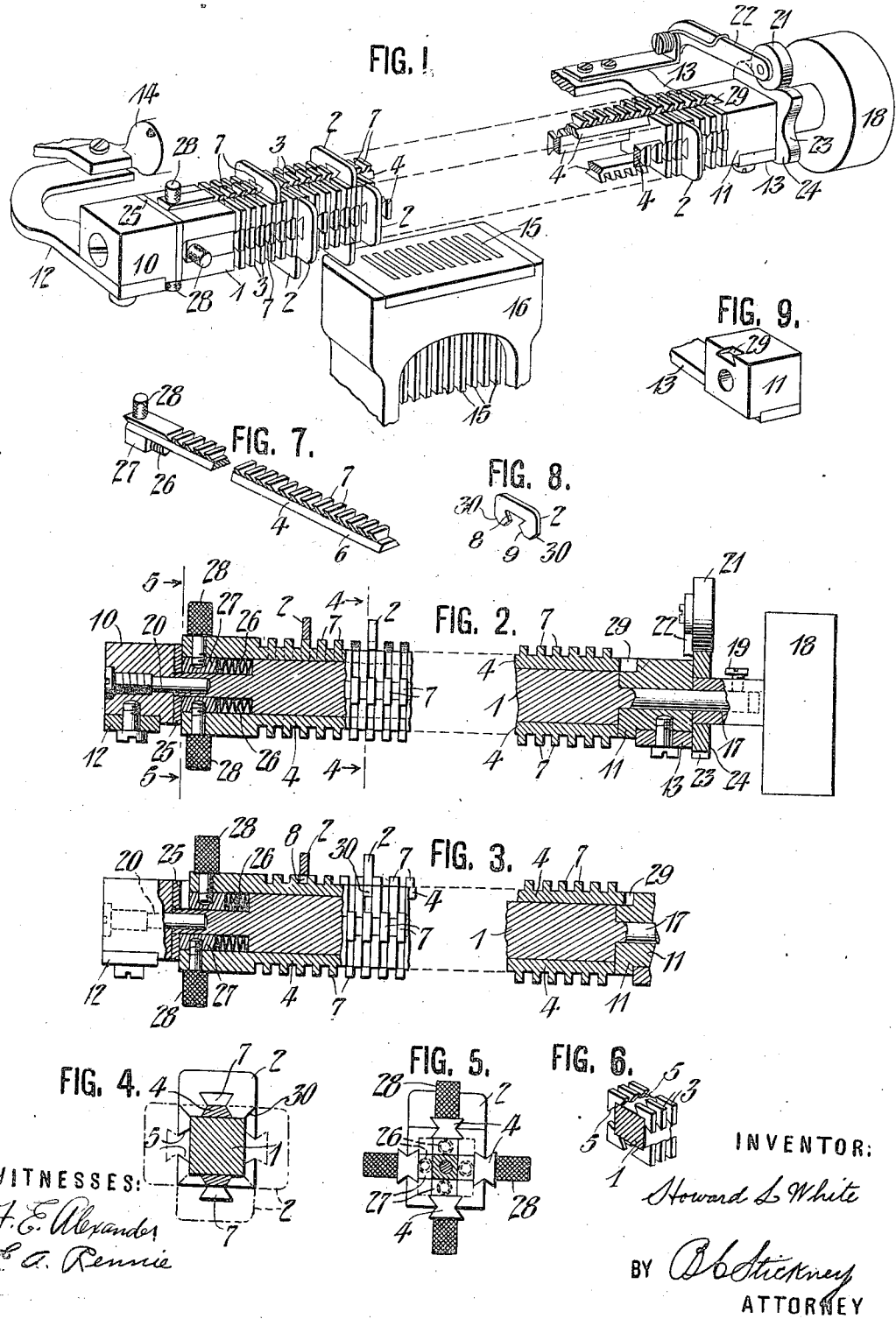

HOWARD L. WHITE, OF NEW YORK, N. Y., ASSIGNOR TO UNDERWOOD TYPEWRITER COMPANY, OF NEW YORK, N. Y., A CORPORATION OF DELAWARE.

TYPE-WRITING MACHINE.

1,158,609. Specification of Letters Patent. Patented Nov. 2, 1915.

Application filed October 2, 1913. Serial No. 792,925.

*To all whom it may concern:*

Be it known that I, HOWARD L. WHITE, a citizen of the United States, residing in Brooklyn borough, city of New York, in the county of Kings and State of New York, have invented certain new and useful Improvements in Type-Writing Machines, of which the following is a specification.

My invention relates to tabulating mechanism for typewriting machines, and a feature of the invention is an improved form of stop-carrying rack bar having a series of rack teeth on each side, and means for independently supporting adjustable stops on each side of the rack bar. The stops are of such form and size as to seat between adjacent teeth of the racks, each stop projecting from one side only of the rack bar. The teeth on each rack may have intermediate portions cut away to form a recess or guideway extending longitudinally of the rack bar to receive a multiple-stop locking bar or key, the latter being provided with a series of teeth or locking detents to register with the rack teeth when the locking bar is in one position, and permit the stops to be placed on the rack bar, the locking bar or rod being then movable longitudinally to cause said detents to enter correspondingly-shaped openings in the stops, and thereby lock them in position. The locking rod when in released position may interlock with a bearing block in which the rack bar is journaled, and thus lock the rack bar against rotation. Such interlocking means may comprise a notch in the bearing block in position to register with the locking rod on the upper side of the rack bar, the locking-rod when out of register with said notch, abutting against the face of said bearing block and thus held against movement to stop-releasing position, so that only the stops on the upper face of the rack bar can be removed or adjusted, and then only when the rack bar is locked against rotation. The rack bar is mounted for rotation to bring any set of stops thereon into position to coöperate with a counter-stop or stops, which are preferably located below the rack bar.

Other features and advantages will hereinafter appear.

In the accompanying drawings, Figure 1 is a perspective view of the invention, parts being broken away. Fig. 2 is a longitudinal sectional elevation view of the same. Fig. 3 is a view similar to Fig. 2, but with a locking rod moved to stop-releasing position. Figs. 4 and 5 are sectional views, as indicated by the lines 4—4 and 5—5 respectively, on Fig. 2. Fig. 6 is a fragmentary perspective view of the rack bar. Fig. 7 is a perspective view of one of the locking rods. Fig. 8 is a view of a stop. Fig. 9 is a perspective view of a block in which the right-hand end of the rack bar is journaled.

The rack bar 1 on which the stops 2 are adjustably mounted is preferably square in cross-section, and has formed on each of its four faces a rack or series of teeth 3, preferably spaced to correspond with the letter-spaces of the machine on which it is used. The stops 2 fit snugly between adjacent rack teeth, and are locked in position by means of a locking rod or key 4, one of such rods being provided for each rack. To accommodate the locking rods, the teeth 3 have intermediate portions cut away to form a series of alined recesses 5, forming in effect a continuous groove or guideway extending the length of the rack bar to receive the locking rod 4. The rack teeth being thus cut away provide in effect two rack bars or sets of rack teeth on each face of the rack bar. The sides 6 of the locking bars are beveled, so that the base of the bar is wider than its upper surface, the faces of the rack teeth which abut against the bar being correspondingly beveled, so that the locking rod is held against the bar but is free to move longitudinally thereon.

Formed on the upper surface of the locking rod 4 is a series of teeth or detents 7, which are preferably the same thickness as the rack teeth 3 and spaced the same as the rack teeth, so that they may be brought in register with the teeth of the rack bar to permit the stops 2 to be placed in position. The teeth 7 also have beveled ends, the teeth being longer at their upper faces than at the base, or in other words, they are dovetailed in shape and are adapted to enter correspondingly-shaped openings 8 in the stops 2 to lock the latter to the rack bar. The stops 2 also have inclined faces 9 to bear against the beveled edges 6 of the locking bar.

The rack bar is supported at its ends by blocks 10 and 11 mounted on brackets 12 and 13 respectively, which may be attached to the carriage 14 of the typewriting machine, so that during the travel of the carriage the stops 2 projecting from the lower face of the rack bar may be intercepted by a counter-stop or stops 15 on the machine frame adapted to be projected by the usual mechanism into the path of the stops 2. As shown, the stops 15 comprise a series of decimal tabulator stops mounted in a casing 16 on the machine frame, the stops 2 forming column stops, but it will be understood that the invention might be embodied in various other arrangements, as, for example, the rack bar might be mounted on the machine frame and the coöperating stops on the carriage.

The right-hand end of the rack bar is provided with a bearing spindle 17 journaled in and extending beyond the bearing block 11 to enter the hub of a hand wheel 18 fixed to the spindle by a set screw 19. The left-hand end of the rack bar is supported on a bearing spindle 20 extending through the block 10 into a bearing recess in the rack bar. The rack bar may thus be rotated by turning the hand wheel 18, and is yieldingly held in any one of its four normal positions by a detent roller 21 carried on a spring-pressed arm 22, the roller being adapted to seat in recesses 23 formed in a cam disk 24 mounted on the hub of the hand wheel so as to rotate with the rack.

Each of the locking rods 4 when in its normal locking position bears at its left-hand end against a flange or disk 25 integral with or fixed on the rack bar, the rod being yieldingly held in such position by means of a coil spring 26 seated in a recess in the rack bar and bearing at its outer end against a block 27 secured to the rod 4 by the threaded stem of a finger-piece or knob 28, said stem extending through the rod 4 and threaded into the block 27. The locking rods 4 are also positively held in locking position by the bearing block 11 which abuts against the right-hand ends of the locking rods, except as the rods, through the rotation of the rack bar, are individually brought into alinement with a notch 29 in the block 11.

The dovetailed notch 29 is in position to aline with the uppermost locking rod 4, so that the latter may be moved by means of the knob 28 longitudinally of the rack bar (Fig. 3), causing the end of the rod to enter the recess 29 and bringing the teeth 7 in alinement with the rack teeth 3, so that the stops 2 may be removed or readjusted, or additional stops placed on the rack bar. It will be noted that when a locking rod 4 is in stop-releasing position it interlocks with the block 11 and the rack bar 1 is therefore locked by said rod against rotation, nor can any stops be removed or replaced except on the uppermost face of the rack bar. It will also be noted that the stops in position to coöperate with the counter-stops are held by a key 4 which is positively locked, so that there is no possibility of the stops being accidentally displaced or removed from the rack bar. The rack bar may be considered as comprising four sections formed by the two diagonal planes including the longitudinal edges of the rack bar. The corners of the stops 2 are beveled at 30 so that the stops, which preferably extend the full length of the rack teeth, will not project beyond said planes. As each set of stops 2 projects from only one side of the rack bar, and is supported solely by the rack teeth and locking key on one face of the bar, and does not project through said planes, there can be no interference between the several sets of stops, which are each adjustable entirely independently of the other sets.

Variations may be resorted to within the scope of the invention, and portions of the improvements may be used without others.

Having thus described my invention, I claim:

1. In tabulating mechanism, a stop-supporting bar having rack teeth on one face thereof, and means coöperating with said teeth for holding on said face, stops arranged to project from said face only, said means comprising a locking key extending longitudinally of the bar in said face, the rack teeth being cut away to provide a guideway in which the key is guided and held against said face, the key being confined between the longitudinal edges of said face.

2. In tabulating mechanism, the combination of a stop-supporting bar having rack teeth on one face thereof, stops to seat between said teeth, and a locking rod extending longitudinally of the bar on said face thereof for locking the stops on said face, the stops projecting from said face only, the rack teeth on said face formed to interlock with the locking rod to hold it against the stop-supporting bar, but permitting relative longitudinal movement of said bar and said rod into and out of position for locking the stops to the bar.

3. In tabulating mechanism, the combination of a supporting bar provided with rack teeth on one face thereof to provide interdental spaces, stops extending into said spaces and projecting from said face only of the bar, and a locking rod on said face, said teeth being undercut to form a channel between the longitudinal edges of said face in which channel the locking rod is mounted for movement into and out of position to lock the stops to said face of the bar.

4. In tabulating mechanism, the combination of a supporting bar, stops settable at different positions along one face of the bar and projecting from said face only, means on said face to prevent movement of the stops longitudinally of the bar, and a locking key supported on said face of the bar and having detents to enter recesses in the stops to hold them on the bar, said detents and recesses being located between the edges of said face, whereby the means for positioning and holding the stops on the bar are confined to said face of the bar.

5. In tabulating mechanism, the combination of a supporting bar, stops adjustable thereon, and a locking rod having a dovetailed body portion and dovetailed detents, said bar provided with a channel to receive the locking rod, said stops having dovetailed openings in the body portions thereof to receive the detents on said rod for locking the stops in position.

6. In tabulating mechanism, the combination of a supporting bar having rack teeth on one face thereof, and a locking rod mounted on said face and having teeth or detents movable into alinement with the teeth on said bar to permit stops to be placed on the bar, said rod movable to throw said detents out of alinement with the rack teeth and into position to interlock with the stops.

7. In tabulating mechanism, the combination of a rack bar provided with rack teeth on one face, a locking rod mounted on said face and movable relatively thereto in a longitudinal direction, said rod provided with dovetailed teeth alining with the rack teeth in one position of the rod, and movable to positions intermediate the rack teeth, and stops held in position between the rack teeth and formed with dovetailed openings to receive the teeth on the locking rod, whereby the stops are locked to the rack bar and held against movement longitudinally thereof by means on one face only of the rack bar.

8. In tabulating mechanism, the combination of a rack bar formed with racks on different faces, a locking rod on each of said faces, and stops adjustable on said bar and each supported and held in position by the locking rod and rack teeth on one side only of the bar.

9. In tabulating mechanism, the combination of a rack bar having racks on adjacent faces thereof, stops supported on said racks, and locking rods to hold said stops in position, each of said stops projecting from only one face of the rack bar.

10. In tabulating mechanism, the combination of a rotatably-mounted stop-supporting bar, a locking rod mounted on the bar and movable longitudinally into and out of position to lock a set of stops on the bar, and means to positively lock said bar against movement into stop-releasing position except when the bar is in one position of rotation.

11 In tabulating mechanism, the combination of a stop-supporting bar, a series of stops thereon, a coöperating counter-stop, said bar being rotatably mounted to bring its stops into position to coöperate with the counter-stop, a locking rod movable into and out of position to lock the stops on the bar, and means to prevent the locking rod from being moved into stop-releasing position when the stops are in position to coöperate with the counter-stop.

12. In tabulating mechanism, the combination of a rotatably-mounted, horizontal stop-supporting rack bar, a series of stops mounted thereon and projecting from the bar, a counter-stop beneath said bar to coöperate with said stops when the rack bar is rotated to bring the stops to depending position, a key to lock said stops to the rack bar, and means to positively prevent said key from being moved to stop-releasing position except when the rack bar has been rotated to position to project said stops upwardly.

13. In tabulating mechanism, the combination of a rotatably-mounted rack bar having racks on its faces, locking keys for locking different sets of stops on the rack bar, and means to hold said keys in locking position, said rack bar being rotatable to bring the keys successively into position to free them from said holding means and permit them to be moved to stop-releasing position.

14. In tabulating mechanism, the combination of a stop-supporting bar mounted for rotation about its axis, locking keys mounted on the faces of said bar and extending longitudinally thereof, said keys each movable longitudinally into and out of position to lock a set of stops on the bar, and a block in which the bar is journaled for rotation, said block abutting against the ends of said keys and holding them against movement to stop-releasing position, said block formed with a recess with which the keys are successively brought into alinement during the rotation of the supporting bar, the keys being movable to project into the said recess and thereby brought into position for releasing the stops.

15. The combination with a rack bar having rows of teeth on different sides, of tabulator stops adjustable along said sides, a stop being insertible in one side in the same plane with a stop inserted in another side of the bar, and locking means carried by the rack bar and movable thereon into and out of locking engagement with said stops to hold them where inserted on said bar.

16. The combination with a rack bar having a row of rack teeth on each of its four sides, of stops adjustable along each of said sides, each stop being adjustable into the same plane with a stop on any of the other three sides of the bar, and locking means carried by the rack bar and movable thereon into engagement with said stops to hold them locked on the bar.

17. The combination with a rack bar having a row of rack teeth on each of two adjacent sides, of a set of stops on each of said sides, each of the stops on one side being adjustable along said side into the same plane with any stop on the said adjacent side, and a locking bar for each set of stops movable into and out of interlocking engagement with all the stops of the set.

18. The combination with a column stop rack bar and column stops thereon, of means shiftable on the rack bar to secure the column stops thereto, said stops projecting from one side only of said bar.

19. The combination with a column stop rack bar having rack teeth on different sides thereof, of column stops insertible on said sides, and locking means slidable on the rack bar to secure the stops thereto, each of said stops projecting only from a single side of the bar on which it is inserted.

20. The combination with a rack bar having rack teeth on one face thereof, of a set of stops adjustably mounted on said rack bar and projecting only from said face, and a key extending along said face and movable into and out of position to lock the stops on the bar.

21. In a tabulating mechanism, the combination of a rack bar having teeth on different faces thereof, sets of stops removably connected to said rack bar, the stops of each set projecting from only one face of the rack bar, and a locking bar or key for each set of stops extending along the face of the bar on which said stops are mounted, and shiftable longitudinally of the bar into and out of locking engagement with the stops.

22. In a tabulating mechanism, the combination with a rack bar having rack teeth on one side thereof, of a stop having a holding portion to enter an interdental space on said side of the bar, and a projecting portion in the same plane with the said holding portion, the stop projecting only from said side of the rack bar, and means to lock said stop to the rack bar.

23. The combination with a rack bar having rack teeth on one side thereof, of stops adjustable to different positions along the bar, each stop projecting only from the said side of the rack bar and being flat so that each face of the stop lies wholly in a single plane, and locking means carried by the rack bar and movable into and out of interlocking engagement with the stops.

24. In tabulating mechanism, the combination of a stop-supporting bar and stops adjustable along a face of the bar to different positions thereon, said face provided with means to prevent displacement of the stops from their adjusted positions in a direction lengthwise of the bar, and locking means mounted on said face of the bar to lock the stops to the bar, said locking means located wholly between the longitudinal edges of said face, whereby the stops are supported and locked on one face of the bar independently of the other faces thereof.

25. In tabulating mechanism, the combination of a stop-supporting bar provided with rack teeth on different faces thereof providing interdental spaces at letter-space intervals along said faces, stops individually settable on the bar and fitting in said spaces, each stop engaging and projecting from one face only of the bar, whereby the stops on one face may be adjusted to any letter-space position along the bar without interference with the stops at the same or different positions lengthwise of the bar on another face thereof, and multiple-stop locking bars, one mounted on each of said faces, the rack teeth on each face having portions cut away to provide a channel for the locking bar, said stops formed with openings to receive the locking bars and thereby lock the stops to the stop-supporting bar.

26. In tabulating mechanism, the combination of a stop-supporting bar provided with rack teeth on different faces thereof providing interdental spaces at letter-space intervals along said faces, stops individually settable on the bar and fitting in said spaces, each stop engaging and projecting from one face only of the bar, whereby the stops on one face may be adjusted to any letter-space position along the bar without interference with the stops at the same or different positions lengthwise of the bar on another face thereof, and multiple-stop locking bars, one mounted on each of said faces, the rack teeth on each face having portions cut away to provide a channel for the locking bars, the locking bars provided with locking detents at letter-space intervals, the stops provided with openings to receive said detents, the locking bars being adjustable longitudinally of the stop-supporting bar to bring the detents thereon in register with the rack teeth and thereby permit the placing or removal of the stops.

27. In tabulating mechanism, the combination of a stop-supporting bar provided with rack teeth on different faces thereof providing interdental spaces at letter-space intervals along said faces, stops individually settable on the bar and fitting in said spaces, each stop engaging and projecting from one face only of the bar, whereby the stops on one face may be adjusted to any letter-space position along the bar without interference with the stops at the same or different positions lengthwise of the bar on another face thereof, multiple-stop locking bars, one mounted on each of said faces, the rack teeth on each face having portions cut away to provide a channel for the locking bar, the locking bars provided with locking detents at letter-space intervals, the stops provided with openings to receive said detents, the locking bars being adjustable longitudinally of the stop-supporting bar to bring the detents thereon in register with the rack teeth and thereby permit the placing or removal of the stops; said stop-supporting bar being mounted for rotation to bring the stops on any face thereof into a position for coöperation with a counter stop, means for holding the stop-supporting bar in its different positions of rotation, and means for holding the locking bars in their locking position, and thereby preventing the stops from being removed, except when the stop-supporting bar is in a certain rotative position.

HOWARD L. WHITE.

Witnesses:
 TITUS H. IRONS,
 GEO. W. NAYLOR.

Copies of this patent may be obtained for five cents each, by addressing the "Commissioner of Patents, Washington, D. C."